(12) United States Patent
Takano (10) Patent No.: US 7,102,852 B2
(45) Date of Patent: Sep. 5, 2006

(54) YOKE STRUCTURE WITH A STEP

(75) Inventor: Kenichi Takano, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 399 days.

(21) Appl. No.: 10/776,813

(22) Filed: Feb. 11, 2004

(65) Prior Publication Data

US 2005/0174686 A1    Aug. 11, 2005

(51) Int. Cl.
*G11B 5/23* (2006.01)
(52) U.S. Cl. .................................... 360/119
(58) Field of Classification Search ........... 360/317
See application file for complete search history.

(56) References Cited

U.S. PATENT DOCUMENTS

| | | | |
|---|---|---|---|
| 6,029,339 A | 2/2000 | Chang et al. | 29/603.14 |
| 6,111,724 A | 8/2000 | Santini | 360/126 |
| 6,337,783 B1 | 1/2002 | Santini | 360/317 |
| 6,473,276 B1 | 10/2002 | Chang et al. | 360/317 |
| 6,504,675 B1 | 1/2003 | Shukh et al. | 360/125 |

*Primary Examiner*—A. J. Heinz
*Assistant Examiner*—Mark Blouin
(74) *Attorney, Agent, or Firm*—Saile Ackerman LLC; Stephen B. Ackerman (57) ABSTRACT

A planar top yoke in a magnetic write head is disclosed. The top yoke includes a backside region and a second pole tip region that is thinner than the backside region and forms a step at the ABS. Alternatively, a front section of the backside region includes a step with a thickness greater than the second pole tip region. Therefore, flux is directed from a thicker backside region toward the gap side of the second pole tip layer near the ABS. A lower flux density is formed at the top of the step at the ABS which reduces the flank field/gap field ratio and prevents unwanted erasure of adjacent data tracks. A high gap field is achieved while maintaining a low flank field during high write current conditions. The step recess from the ABS toward the backside region is about 0.2 to 2 microns.

26 Claims, 9 Drawing Sheets

YOKE STRUCTURE WITH A STEP

FIELD OF THE INVENTION

The invention relates to a write head having a planar top yoke which includes a second pole tip region at the ABS that is thinner than the backside region of the top yoke and in particular to a second pole tip region with a step that controls the flux flow and reduces the leakage field at the second pole tip.

BACKGROUND OF THE INVENTION

A magnetic disk drive includes a rotating magnetic disk with circular data tracks and read and write heads that may form a merged head which is attached to a slider on an arm which positions the head. During a recording operation, the merged head is suspended over the magnetic disk on an air bearing surface (ABS). The write head has first and second pole pieces that are connected at a back gap region. The first and second pole pieces or yokes have first and second pole tips, respectively, that are separated by a write gap layer and terminate at the ABS. An electric current is passed through coils formed around the back gap region to magnetize the first and second pole pieces. As the leading first pole tip is moved over a magnetic disk, a magnetic flux passes from the second pole tip onto a data track and then to the first pole tip and is called the gap field.

A trend in the industry is to increase the recording density which requires increased coercivity to overcome the demagnetization field of the magnetic transition. However, as the data track width shrinks, the write head field strength tends to decrease due to saturation of the second pole tip region. Unfortunately, a high-end hard disk drive (HDD) generates such a high data rate transfer that not only is greater write head field strength required, but a faster flux rise time is needed. To produce a large enough overwrite value, the write current is boosted and a large overshoot of its waveform results. This condition causes severe excess saturation of the second pole tip and adjacent track erasures often occur.

Figure 1:
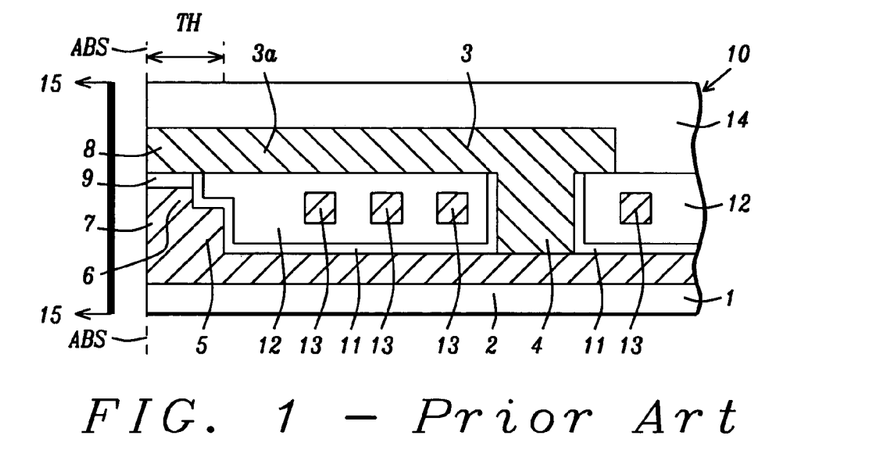
FIG. 1 is a cross-sectional view showing a conventional planar write head with a top yoke comprised of a second pole tip region that has the same thickness as the planar top yoke.

A conventional planar write head 10 is depicted in FIG. 1 and features a bottom yoke or first pole piece 2 formed on a substrate 1 which may be ceramic, for example. There is a planar top yoke or second pole piece 3 that is connected to the bottom yoke 2 through a back gap region 4 and which is covered by an overcoat layer 14. The bottom yoke 2 has a pedestal 5 with a first pole tip 7 and a throat region 6. The top yoke 3 has a second pole tip region 3a that terminates at a second pole tip 8 at the ABS. The throat region 6 and second pole tip region 3a are separated by a write gap layer 9 which is non-magnetic and extends from the ABS toward the back gap region 4 by a distance TH which is the throat height. At this point, the bottom yoke 2 begins to separate from the top yoke 3 and forms a cavity with sidewalls and a bottom. A conformal first dielectric layer 11 is formed on the sidewalls and bottom of the cavity. A coil layer 13 is wrapped between the top yoke 3 and bottom yoke 2 and around the back gap region 4 and is contained in a second dielectric layer 12 which is coplanar with the top of the write gap layer 9. This design enables the top yoke 3 to be formed on a planar surface to allow good track width control for the second pole tip 8 definition. In a merged head design, the bottom yoke 2 of the write head also serves as the top layer of the read head (not shown).

Figure 2:
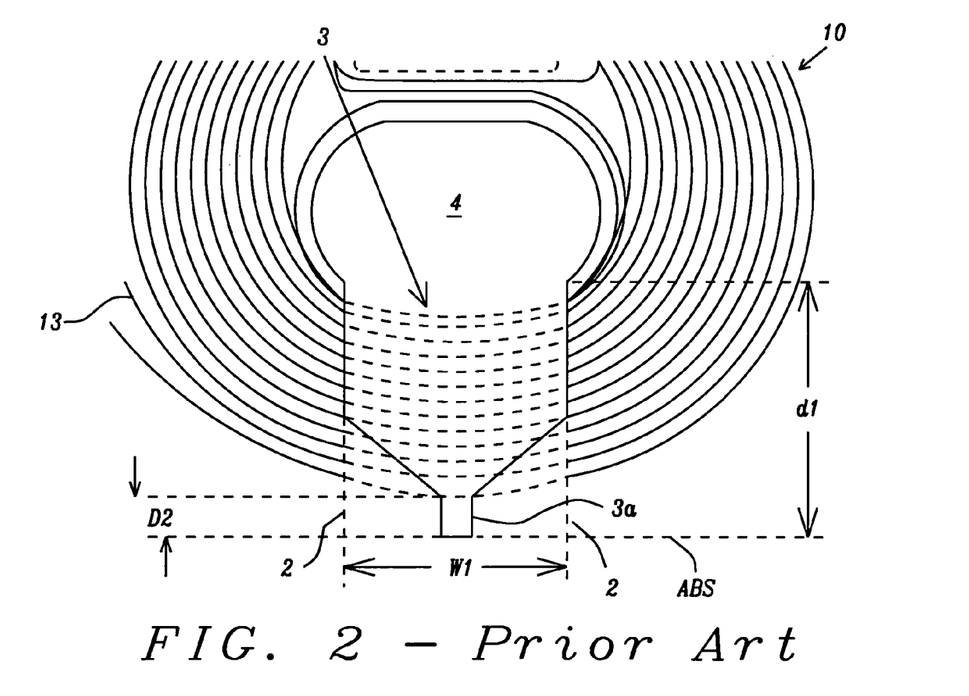
FIG. 2 is a top-down view of a conventional planar write head that depicts the shape of the planar top yoke and its relationship to the ABS and underlying coil layer.

Referring to FIG. 2, a top-down view of the write head 10 is depicted in which the overcoat layer 14 and dielectric layers 11, 12 have been removed to show the arrangement of the top yoke 3, bottom yoke 2, back gap region 4, and coil layer 13. The top yoke 3 has a length $d_1$ of about 5 to 25 microns which includes the length $d_2$ of the second pole tip region 3a. The maximum width of the top yoke 3 and bottom yoke 2 is $w_1$. The main body of the top yoke 3 behind the second pole tip region 3a is also referred to as the back side region.

Figure 3:
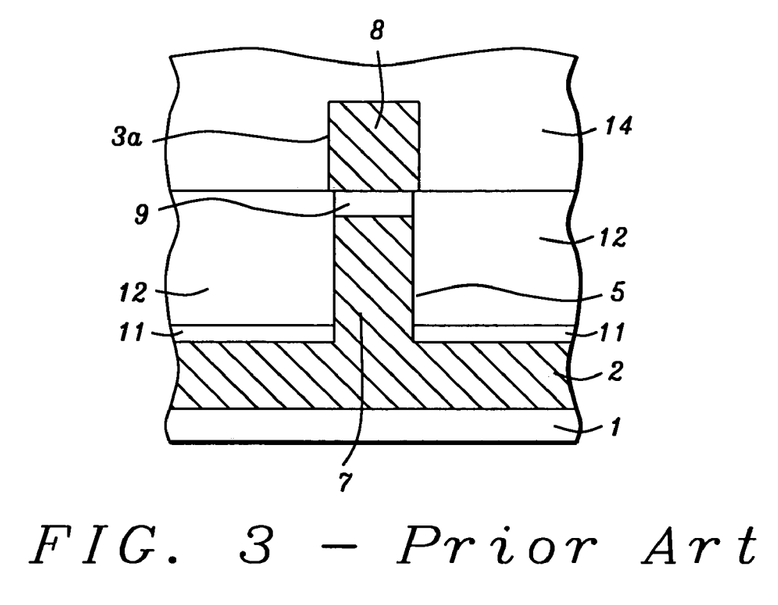
FIG. 3 is a cross-sectional view from ABS that shows the second pole tip, first pole tip, and write gap layer of the prior art planar write head depicted in FIG. 1.

Referring to FIG. 3, a side view from the plane 15—15 in FIG. 1 is shown that depicts the second pole tip region 3a and the second pole tip 8 at the ABS end of the top yoke. The write gap layer 9 overlays the first pole tip 7 and the pedestal 5. The second dielectric layer 12 is on either side of the write gap layer 9 and pedestal 5 at the ABS while the second pole tip region is surrounded on the top and sides by the overcoat layer 14.

Figure 4:
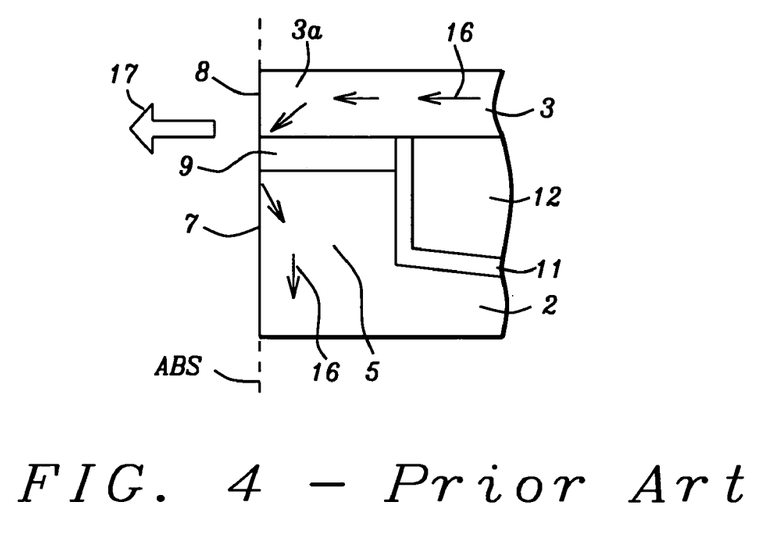
FIG. 4 is an enlarged view of pole tip regions in FIG. 1 that indicates a large flank field near the second pole tip in addition to the gap field used for recording.

In a conventional planar writer shown in FIG. 4 which is an enlarged view of the ABS end of write head 10 in FIG. 1, the top yoke 3 can provide a significant amount of flux 16 toward the write gap layer 9. The flux 16 passes from the second pole tip region 3a through the second pole tip 8 onto a recording track (not shown) and then through the first pole tip 7 and into pedestal 5. However, there is some leakage represented by a flank field 17 across the ABS onto an adjacent recording track. When a high write current is employed with large overshoot waveforms, then a significant amount of erasure on adjacent data tracks occurs because of the flank field. Therefore, a new write head design is needed that reduces the flank field to prevent unwanted data track erasure.

In U.S. Pat. No. 6,473,276, a merged magnetic head which includes a write head with a single sided notched first pole piece is described. A data track is formed that has a narrow erase band on one side and a wide erase band on the other side. The narrow erase band enables a large signal amplitude while a wide erase band allows flexibility in spacing the read head from adjacent tracks.

A magnetic write head with a zero throat height (ZTH) layer is disclosed in U.S. Pat. No. 6,111,724. The ZTH is formed close to the first and second pole tips to reduce flux loss between the first and second pole pieces. The method of forming the ZTH layer avoids reflective notching and thereby improves definition of the second pole tip.

Another second pole piece is described in U.S. Pat. No. 6,337,783 where a second yoke component is stitched to the back and sides of the top edge of a second pole tip to provide improved magnetic coupling. The top stitched area is minimized so that the coil layers may be closer to the ABS to increase the data rate of the head. In related art disclosed in U.S. Pat. No. 6,029,339, the stitching of the yoke component to the second pole tip is achieved by a method that avoids reflective notching in the top yoke.

Unwanted side writing is prevented in U.S. Pat. No. 6,504,675 by modifying the second pole tip such that the leading edge of the pole tip is narrower than the trailing edge. Thus, the second pole tip has a trapezoidal cross-section with tapered sides.

SUMMARY OF THE INVENTION

One objective of the present invention is to provide a planar top yoke in a write head that reduces the flank field at the ABS.

A further objective of the present invention is to provide a planar top yoke in accordance with the first objective that does not reduce the gap field strength for writing a data track.

These objectives are achieved in a first embodiment with a write head which includes a top planar yoke comprised of second pole tip region and a backside region. The backside region has a front section adjacent to the back end of the second pole tip region as viewed from the ABS plane. The front end of the second pole tip region is the second pole tip formed along the ABS. The top planar yoke is connected to a bottom yoke through a back gap region. The bottom yoke has a pedestal with a short throat region and a first pole tip formed at the ABS. The throat region and second pole tip region are separated by a write gap layer. In one embodiment, the top of the write gap layer is coplanar with the top of a cavity formed between the top and bottom yokes. The cavity has sidewalls and a bottom which is filled with a dielectric layer and extends from the throat region to the back gap region and beyond. Enclosed within the dielectric layer is a coil layer which surrounds the back gap region. An insulating overcoat layer is located on the planar top yoke.

The second pole tip region has a first thickness, a first width, two sides, a top and bottom, a back end that connects to the front end of the backside region, and a front end formed along the ABS. The backside region of the top yoke has a second thickness greater than the first thickness, a top and bottom, and includes a front section adjacent to the second pole tip region that flares outward and becomes wider with increasing distance from the second pole tip region. A key feature is that the top of the second pole tip region forms a step down toward the ABS from the front section of the top yoke. The second pole tip region has a length of about 0.2 to 2 microns from the ABS to the front end of the backside region of the top yoke.

The bottoms of the second pole tip region and backside region are coplanar with the top of the write gap layer. The sides of the second pole tip region and backside region are perpendicular to the plane containing the top surface of the write gap layer. This design causes the magnetic flux from the backside region of the top yoke to pass through the second pole tip region with a tilted angle toward the bottom or so-called gap side near the ABS. As a result, the flux is concentrated on the gap side of the second pole tip region and a lower flux density near the top of the second pole tip region minimizes the magnitude of the flank field.

In a second embodiment, the planar write head is comprised of the same components as described in the first embodiment. The second pole tip region has a first thickness, a first width, two sides, a top and bottom, a back end that connects to the front section of the backside region, and a front end or second pole tip formed along the ABS. However, the front section of the backside region is comprised of two segments with different thicknesses that form a second step. A first segment of the front section has a second thickness greater than the first thickness, two sides, a top and bottom, a back end that connects to the front end of a second segment, and a front end adjacent to the back end of the second pole tip region. The second segment of the front section has a third thickness greater than the second thickness and includes two sides, a top and bottom, and a front end adjacent to the back end of the first segment. The second segment has the same thickness as the main body of the top yoke in the backside region. The first segment represents a step down from the second segment toward the ABS and the second pole tip region is a step down from the first segment toward the ABS.

The bottoms of the first and second segments and the second pole tip region are coplanar with the top surface of the write gap layer. The sides of the first and second segments and of the second pole tip region are perpendicular to the plane containing the top surface of the write gap layer. This design causes the magnetic flux from the backside region of the top yoke to pass through the first and second segments of the front section with a tilted angle toward the bottom or so-called gap side of the second pole tip region. As a result, there is a higher flux density in the second pole tip region near the write gap layer at the ABS and a lower flux density near the top of the second pole tip region that minimizes the magnitude of the flank field.

BRIEF DESCRIPTION OF THE DRAWINGS

FIG. 13a is a plot that shows flank field magnitude as a function of down track position for a conventional planar write head while

DETAILED DESCRIPTION OF THE INVENTION

The present invention is a planar write head with a top yoke that is designed to direct magnetic flux during a write operation toward the gap side of a thinner second pole tip region in order to minimize a flank field. The drawings are provided by way of example and are not intended to limit the scope of the invention. Additionally, the figures are not necessarily drawn to scale and the relative sizes of the various elements may be different than in an actual write head.

Figure 5:
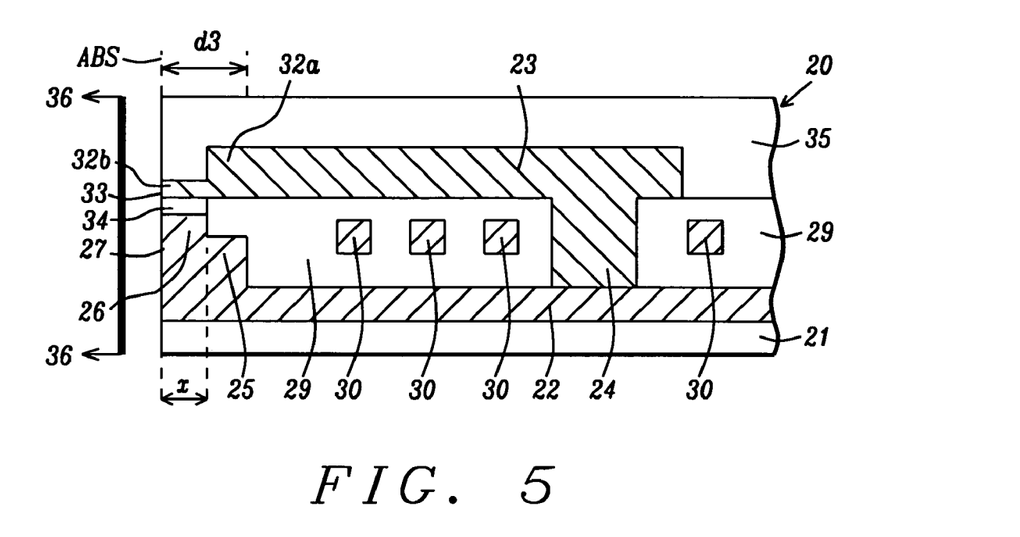
FIG. 5 is a cross-sectional view of a write head with a planar top yoke that has a second pole tip region which forms a step near the ABS according to the present invention.

A first embodiment is set forth in FIGS. 5–8 in which a key feature is a planar top yoke comprised of a backside region and a second pole tip region that forms a single step near the ABS. Referring to FIG. 5, a planar write head 20 is shown that is part of a magnetic disk drive. Typically, the write head 20 is held by an arm (not shown) and is suspended over a rotatable magnetic disk on an air bearing surface (ABS) when writing a data track. It is important that during a writing operation the write head does not erase adjacent data tracks. According to the present invention, the shape of the write head is designed to minimize a flank field to prevent unwanted erasures.

The write head 20 is comprised of a first pole piece or bottom yoke 22 that is formed on a substrate 21. In one embodiment, the substrate 21 is a non-magnetic material such as ceramic. Optionally, the write head may be part of a merged head design in which the bottom yoke 22 also serves as the top layer in a read head (not shown). The bottom yoke is connected to a second pole piece or top yoke 23 through a back gap region 24. The length of the top yoke 23 from the ABS to the back gap region is about 5 to 25 microns. The bottom yoke 22, top yoke 23, and back gap region 24 may be comprised of a ferromagnetic material such as NiFe or permalloy or may be a material with a high magnetic moment such as CoNiFe, FeCo, or FeCoN. The bottom yoke 22 has a pedestal 25 with a short throat region 26 and a first pole tip 27 which is the surface that is formed along the ABS.

The planar top yoke 23 has a narrow front section 32a and a second pole tip region 32b which have a combined length $d_3$ of about 1 to 3 microns from the ABS toward the back gap region 24. A key feature of the present invention is that the second pole tip region 32b which terminates at the second pole tip 33 along the ABS is thinner than the front section 32a and forms a step down from the front section toward the write gap layer 34. The front section 32a, second pole tip region 32b, and remainder of the top yoke 23 form a single piece. The second pole tip region 32b and throat region 26 are separated by a write gap layer 34 having a thickness of about 0.08 to 0.14 microns which extends from the ABS to a distance x of about 0.4 to 1.2 microns toward the back gap region 24. Typically, the write gap layer 34 is comprised of a non-magnetic material such as $Al_2O_3$, silicon oxide, NiCu, Ru, or Pd. It is understood that the second pole tip region 32b and pedestal 25 are comprised of the same material as in the top yoke 23 and bottom yoke 22.

In one embodiment, there is a cavity formed between the bottom yoke 22 and top yoke 23 that extends from the short throat region 26 to behind the back gap region 24. There is a dielectric layer 29 formed on the bottom yoke 22 which fills the cavity and has a top surface that is coplanar with the write gap layer 34. Alternatively, there may be more than one dielectric layer in the cavity. Within the dielectric layer 29 is a coil layer 30 that is wrapped around the back gap region 24. Optionally, more than one coil layer may be employed. The dielectric layer 29 is typically comprised of alumina, silicon oxide, silicon nitride, or a resin. The coil layer 30 includes a plurality of coils which are generally comprised of Cu or Au. An overcoat layer 35 is formed on the top yoke 23 and back gap region 24 and is preferably a dielectric layer comprised of alumina or silicon oxide.

Figure 6:
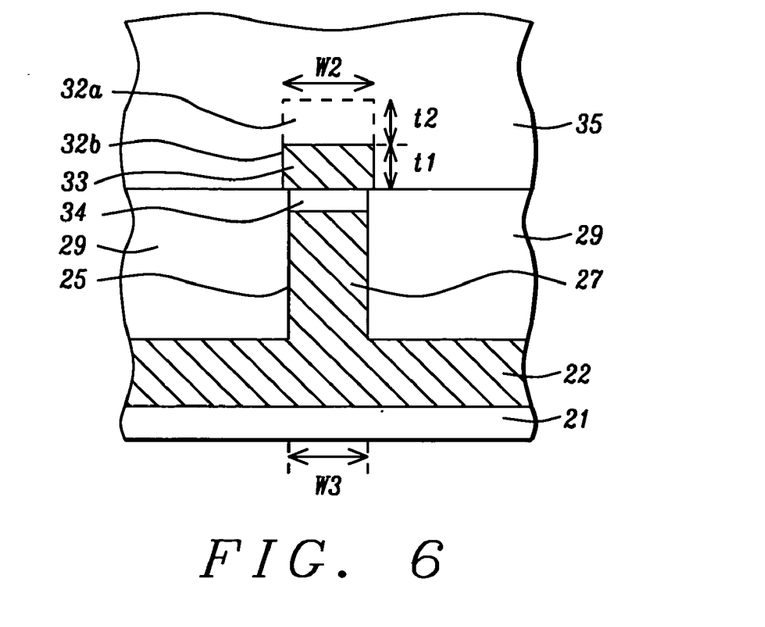
FIG. 6 is a cross-sectional view from the ABS of the write head structure in FIG. 5 that depicts a second pole tip region with a smaller thickness than the backside region of the top yoke.

Referring to FIG. 6, a cross-sectional view of the write head 20 from the plane 36—36 in FIG. 5 is depicted. The second pole tip region 32b has a width $w_2$ of about 0.1 to 0.25 microns and a thickness $t_1$. The front section 32a of the top yoke is recessed behind the second pole tip region 32b and has a thickness $(t_1+t_2)$, and a width that is typically larger than $w_2$. Moreover, the width of the front section 32a typically increases with increasing distance from the ABS. The thickness $t_1$ is preferably in the range of about 0.4 to 1.2 microns and the thickness $t_2$ is preferably about 0.4 to 1.8 microns. The top surface of the front section 32a is an extension of the top surface of the top yoke 23. The front section 32a also has two sides (not shown) which flare outward as the distance behind the ABS increases, a front end that is adjacent to the back end of the second pole tip region 32b, and a back end that is connected to the front end of the back section of the top yoke 23. The bottoms of the first section 32a and the second pole tip region 32b are coplanar with the write gap layer 34. The second pole tip region 32b has two sides that are perpendicular to the top surface of the write gap layer 34, a back end, and a front end or second pole tip 33 that is coplanar with the ABS.

An important aspect of the present invention is that the second pole tip region 32b is thinner than the front section 32a. In particular, the top of the second pole tip region 32b is stepped down from the top of the front section 32a so that a step is formed from the top yoke 23 toward the ABS. In a preferred embodiment, the width $w_2$ of the second pole tip region 32b is equal to the width $w_3$ of the write gap layer 34, pedestal 25, and the first pole tip 27.

Figure 7:
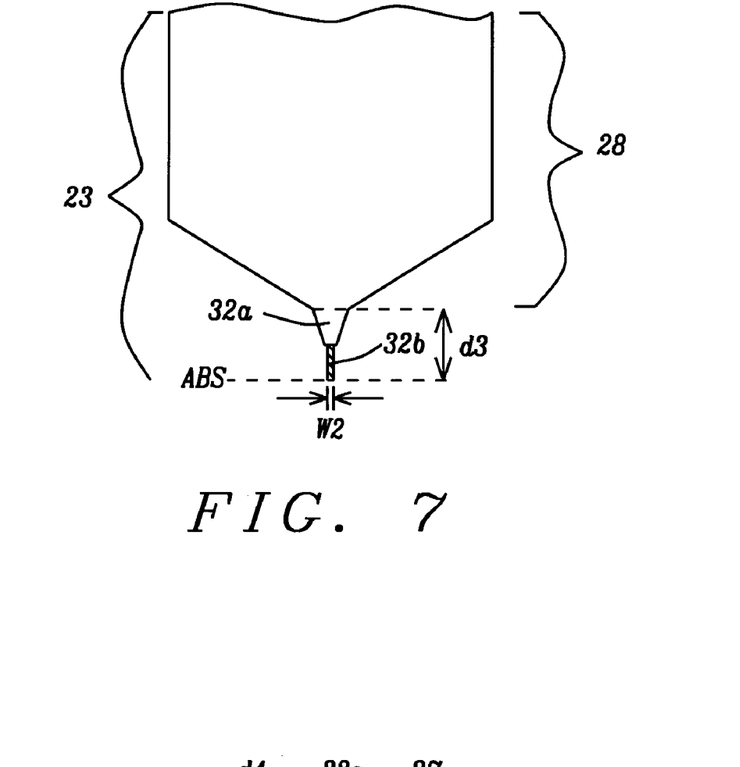
FIG. 7 is a top-down view of the write head structure in FIG. 5 showing the shape of the second pole tip region and backside region of the top yoke.

A top-down view of the top yoke 23 portion of the write head structure 20 is shown in FIG. 7. Note that the front section 32a is narrower than the larger back section 28. The front end of the front section adjacent to the second pole tip region 32b has a smaller width than the back end which is connected to the back section 28 at a distance $d_3$ from the ABS.

Figure 8:
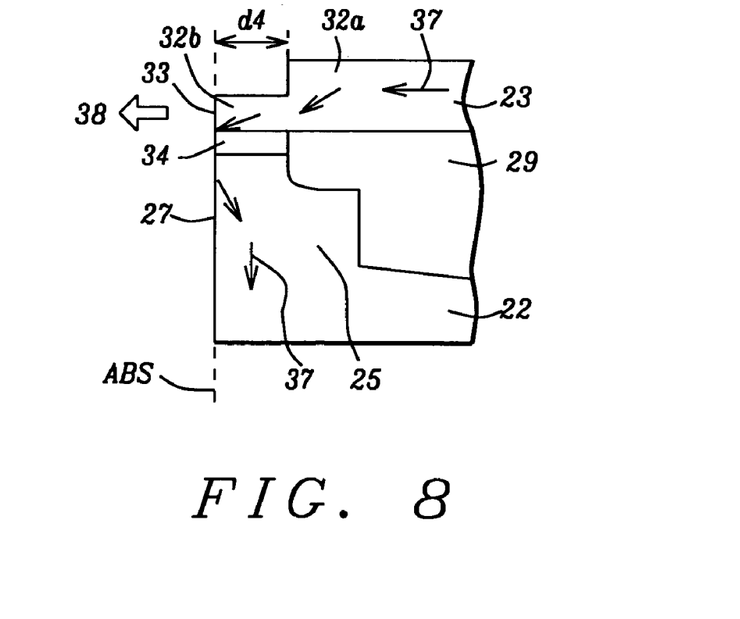
FIG. 8 is an enlarged view of the pole tip regions in FIG. 5 which indicates a reduction in size of the flank field compared to the flank field in FIG. 4.

Referring to FIG. 8, an enlarged view of the write head 20 near the ABS shows that the second pole tip region 32b extends from the ABS to the front section 32a which is a distance $d_4$ of about 0.2 to 2 microns and preferably about 0.3 to 1 microns. In other words, the step in the top yoke 23 extends a distance $d_4$ from the ABS toward the back gap region. When a current is applied to the coil layer 30, a magnetic flux 37 is generated in the top yoke 23 that passes through the front section 32a and is directed toward the bottom (gap side) of the second pole tip region 32b and through the second pole tip 33. In so doing, a weaker flux density is formed near the top of the second pole tip region 32b. As a result, the flank field 38 is significantly less than observed in prior art planar writers such as illustrated in FIGS. 1–4. The gap field is defined as the flux 37 which passes from the second pole tip 33 through the intended magnetic recording track (not shown) adjacent to the ABS. The flux 37 then passes from the recording track through the first pole tip 27 and into the pedestal 25. The thickness (t1+t2) of the front section 32a and top yoke 23 may be adjusted upward to increase the gap field while maintaining the flank field 38 at an acceptable low level.

Figure 13A:
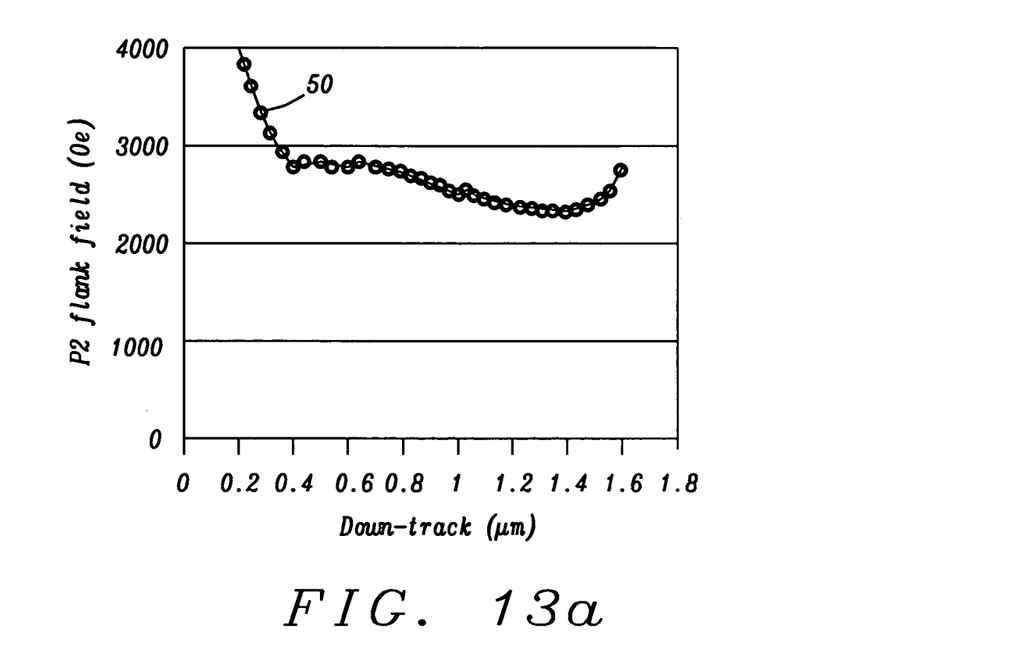
Figure 13B:
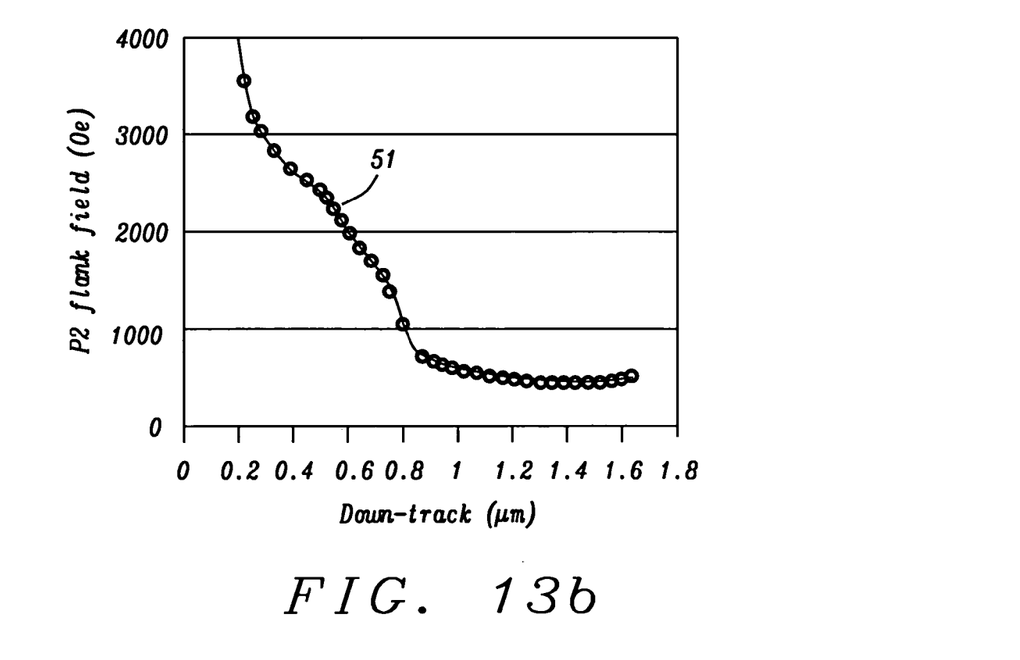
FIG. 13b is a plot that indicates a smaller flank field with the stepped top yoke of the present invention.

One advantage of implementing the first embodiment of the present invention is illustrated in FIGS. 13a–13b in which the flank field 37 is estimated as the maximum in-plane field at the magnetic disk surface at each down track position from the write head for a conventional head (curve 50) and for the write head with a stepped top yoke (curve 51). The results represented by curve 51 were generated with a $t_1$ thickness of 0.7 microns, a $t_2$ thickness of 0.8 microns, and a $d_4$ distance of 0.6 microns. The starting position at 0 microns in FIGS. 13a, 13b is defined as the bottom of the second pole tip region at the ABS where the second pole tip meets the write gap layer. Increasing x-values represent down track positions progressively farther away from the starting position. The write head of the present invention generates a smaller flank field, especially at down-track positions of greater than about 0.3 microns. Note the rapid drop in flank field intensity (oersteds) for curve 51 between the 0.3 and 1 micron down track positions. As mentioned previously, another advantage of the present invention is that a strong gap field can be achieved while keeping the flank field at a low intensity that avoids track erasure.

Figure 14:
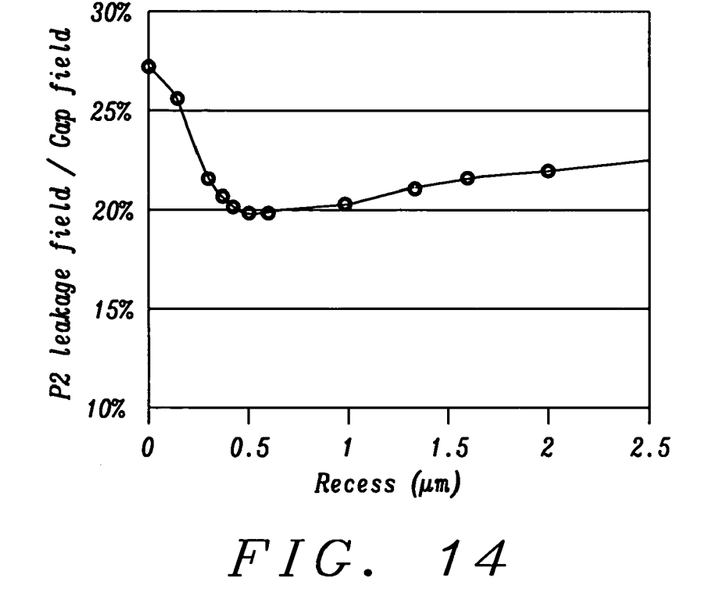
FIG. 14 is a plot that shows the ratio of flank field to gap field as a function of the size of the recess in the step in the top yoke of the first embodiment.

The influence of the size of the recess $d_4$ on the ratio of flank field to gap field has been characterized and is illustrated in FIG. 14. A conventional planar write head where the recess is 0 microns has a flank field/gap field ratio of about 28%. The inventor has found that the flank field/gap field ratio is decreased to about 20% or less by introducing a recess of 0.3 to 1 microns. However, a recess as small as 0.2 microns or as large as 2 microns also offers some benefit.

Figure 15:
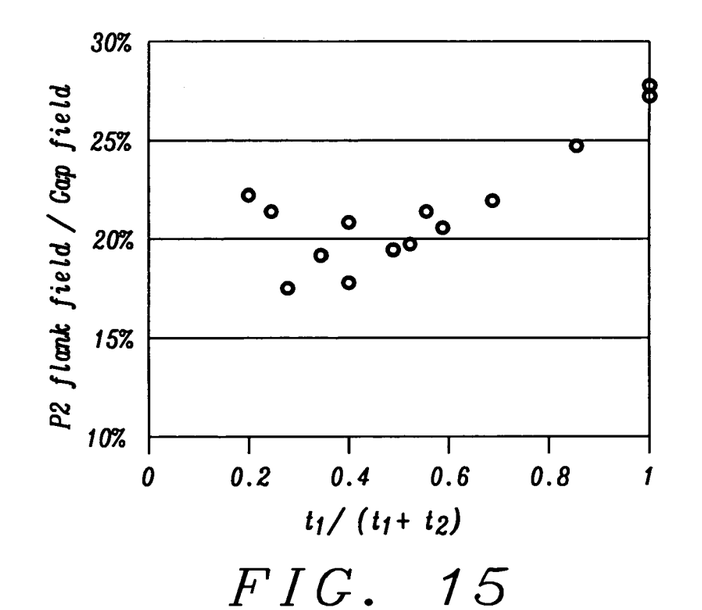
FIG. 15 is a plot which shows the ratio of flank field to gap field vs. the ratio of the thickness of the second pole tip region to the thickness of the backside region according to the first embodiment of the present invention.

Referring to FIG. 15, the present invention has been further characterized by determining the effect of the step height $t_1$ as shown in FIG. 6 on the flank field/gap field ratio. The values on the x-axis represent the ratio $t_1/(t_1+t_2)$ and indicate the largest reduction in flank field occurs when the thickness ratio is between 0.3 to 0.7. The results shown in FIG. 15 were generated with a $t_1$ thickness of 0.7 microns, a $t_2$ thickness of 0.8 microns, and a $d_4$ distance of 0.6 microns.

Those skilled in the art will appreciate that a step in the top yoke of the present invention may be readily constructed by conventional methods. For example, a first yoke layer with a thickness $t_1$ may be formed on the dielectric layer 29 by conventional means. Then a second top yoke layer with a thickness $t_2$ is fabricated on the first top yoke layer by a process sequence involving deposition, patterning, ion etching, and trim milling methods known to those skilled in the art. The second top yoke layer is recessed from the ABS to form a first step.

The present invention also anticipates a write head with a planar top yoke that has a plurality of steps near the ABS. In the exemplary second embodiment depicted in FIGS. 9–12, the top yoke has a second pole tip region that represents one step and an adjacent segment in the front section of the top yoke that represents a second step.

Figure 9:
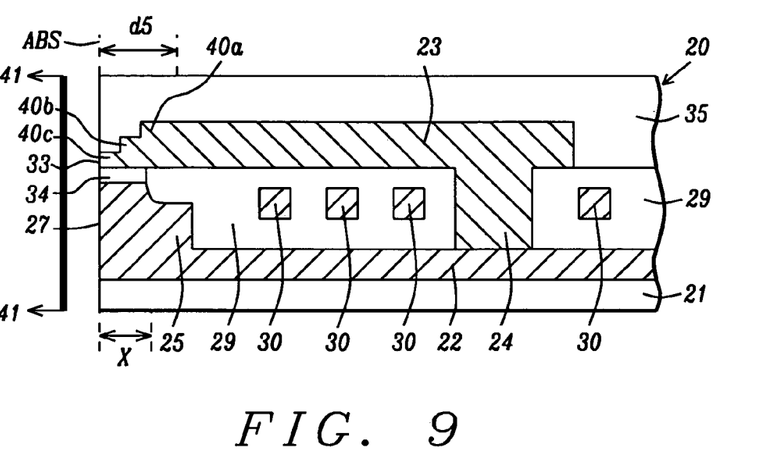
FIG. 9 is a cross-sectional view of a write head with a planar top yoke that has two steps from the backside region toward the ABS according to a second embodiment of the present invention.

Referring to FIG. 9, the write head 20 is comprised of the same components as described in the first embodiment. The write head 20 may be part of a merged head design in which the bottom yoke 22 also serves as the top layer in a read head (not shown). Alternatively, the bottom yoke 22 may be formed on a non-magnetic substrate 21 such as a ceramic.

The planar top yoke 23 has been modified to include two steps. There is a second pole tip region 40c and an adjacent front section of the top yoke 23 comprised of two segments 40a, 40b. The combined length $d_5$ of the second pole tip region 40c and front section is the distance from the ABS to the back end of the segment 40a.

The first segment 40a in the front section is coplanar with the larger back section of the top yoke 23. The second segment 40b in the front section forms a step down from the first segment 40a toward the ABS and the second pole tip region 40c forms a step down from the second segment toward the ABS. The first segment 40a, second segment 40b, and second pole tip region 40c together with the top yoke 23 form a single piece.

Figure 10:
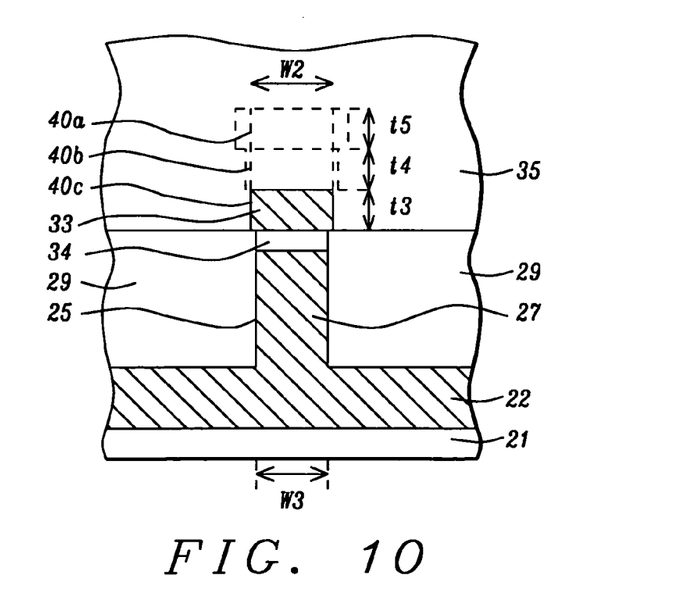
FIG. 10 is a cross-sectional view from the ABS of the write head structure in FIG. 9 that depicts a smaller thickness in second pole tip region than in two segments of a backside region.

Referring to FIG. 10, a cross-sectional view of the write head 20 from the plane 41—41 in FIG. 9 is depicted. The first segment 40a in the front section of the top yoke is recessed behind the second segment 40b and has a thickness $(t_3+t_4+t_5)$ and a width that is typically larger than the width $w_2$. Note that the sides of the first segment 40a, second segment 40b, and second pole tip region 40c are perpendicular to a plane that is formed by the interface of the overcoat layer 35 and dielectric layer 29 and contains the top surface of the write gap layer 34. Furthermore, the bottom of the first segment 40a, second segment 40b, and second pole tip region 40c are coplanar with the top surface of the write gap layer 34. The first segment 40a has a back end that is connected to the front end of the back section in the top yoke and a front end adjacent to the back end of the second segment 40b. The second segment 40b has a width greater than $w_2$, a thickness $(t_3+t_4)$, a back end, and a front end that is adjacent to the back end of the second pole tip region 40c. The second pole tip region 40c has a width $w_2$ of about 0.1 to 0.25 microns, a thickness $t_3$, a back end, and a front end or second pole tip 33 that is coplanar with the ABS.

Preferably, the thickness $t_3$ is about 0.4 to 1.2 microns, thickness $t_4$ is about 0.2 to 1.4 microns, and thickness $t_5$ is about 0.2 to 1.4 microns. An important aspect of the present invention is that the second pole tip region 40c is thinner than the second segment 40b which in turn is thinner than the first segment 40a. In particular, the top of the second segment 40b is stepped down from the top of the first segment 40a and the top of the second pole tip region 40c is stepped down from the top of the second segment. The preferred ratio of $t_3/(t_3+t_4+t_5)$ is from 0.2 to 0.6 and the preferred ratio of $t_4/(t_3+t_4+t_5)$ is from 0.2 to 0.6. In a preferred embodiment, the width $w_2$ of the second pole tip region 40c is equivalent to the width $w_3$ of the write gap layer 34, pedestal 25, and the first pole tip 27.

Figure 11:
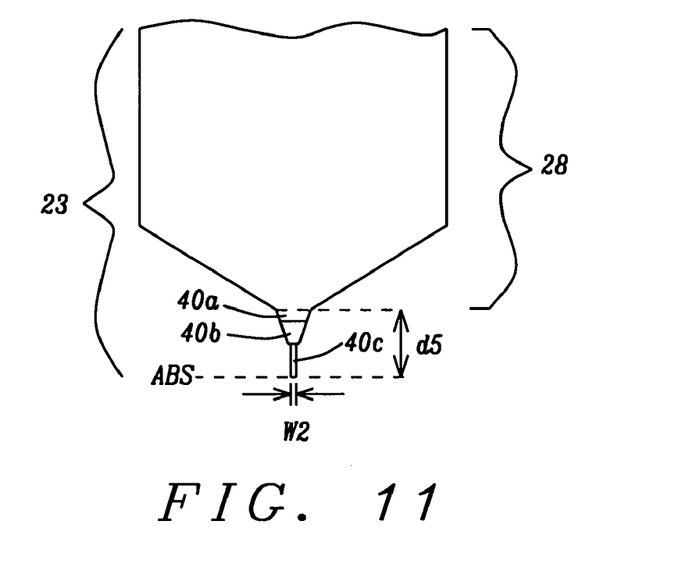
FIG. 11 is a top-down view of the write head structure in FIG. 9 that shows the shape of the second pole tip region and backside region.

Referring to FIG. 11, a top-down view of the top yoke 23 portion of the write head structure 20 is shown. There is a larger back section 28 connected to the back end of the first segment 40a of the front section of the top yoke at a distance $d_5$ from the ABS. The front end of the second segment 40b adjacent to the second pole tip region 40c has a smaller width than the front end of the first segment 40a.

Figure 12:
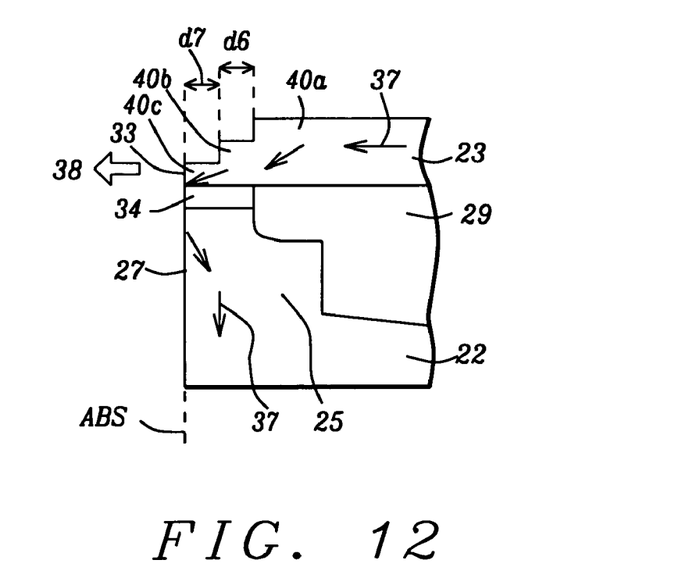
FIG. 12 is an enlarged view of the pole tip regions in FIG. 9 which indicates a reduction in size of the flank field relative to the flank field in FIG. 4.

Referring to FIG. 12, an enlarged view of the write head 20 near the ABS shows that the second pole tip region 40c extends from the ABS to the front end of the second segment 40b which is a distance $d_7$ of about 0.2 to 1.5 microns. The second segment 40b extends from the back end of the second pole tip region 40c to the front end of the first segment 40a which is a distance $d_6$ of about 0.2 to 1.5 microns. In other words, the first step down from the top yoke 23 is comprised of the second segment 40b which has a back end that is recessed by the distance $(d_6+d_7)$ from the ABS. The second step down from the top yoke 23 is comprised of the second pole tip region 40c which extends a distance $d_7$ from the ABS.

When a current is applied to the coil layer (not shown), a flux 37 is generated in the top yoke 23 that passes through the first segment 40a and is directed toward the bottom of the second segment 40b (gap side). Similarly, the flux 37 that passes through the second segment 40b is directed toward the bottom (gap side) of the second pole tip region 40c and through the second pole tip 33. In so doing, a weaker flux density is formed near the top of the second pole tip region 40c near the ABS. As a result, the flank field 38 is significantly less than observed in prior art planar writers such as illustrated in FIGS. 1–4. The flux 37 passes from the recording track through the first pole tip 27 and into the pedestal 25. This design enables the thickness ($t_3+t_4+t_5$) of the first segment 40a and top yoke 23 to be adjusted upward to increase the gap field while maintaining the flank field 38 at an acceptable low level.

The same advantages are achieved in the second embodiment as described for the first embodiment. For instance, the flank field observed for a two stepped yoke as represented by curve 51 in FIG. 13b is decreased significantly at down-track positions compared with a flank field in a conventional planar writer (FIG. 13a). Thus, unwanted erasure of adjacent data tracks is prevented. Furthermore, a high gap field may be generated while controlling the flank field at a low level.

Figure 16:
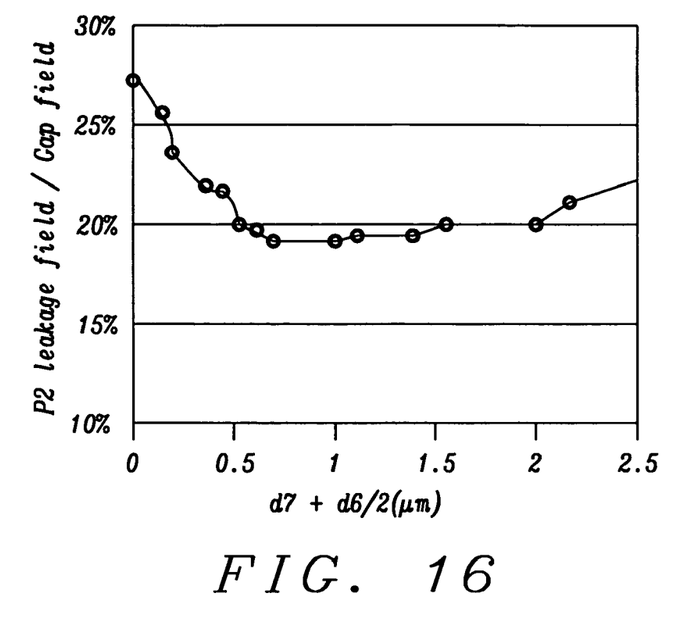
FIG. 16 is a plot which shows the ratio of flank field to gap field as a function of the combined recessed length of the two steps in the top yoke of the second embodiment.

The influence of the size of the recess $d_6+d_7$ on the ratio of flank field to gap field has been characterized and is illustrated in FIG. 16. A conventional planar write head where the recess is 0 microns has a flank field/gap field ratio of about 28%. The inventor has found that the flank field/gap field ratio is decreased to about 20% or less by introducing two steps with $d_7$ and $d_6+d_7$ recesses, respectively. The results shown in FIG. 16 were generated with a $t_3$ 0.7 microns, a $t_4$ thickness of 0.5 microns, and a $t_5$ thickness of 0.5 microns.

Figure 17:
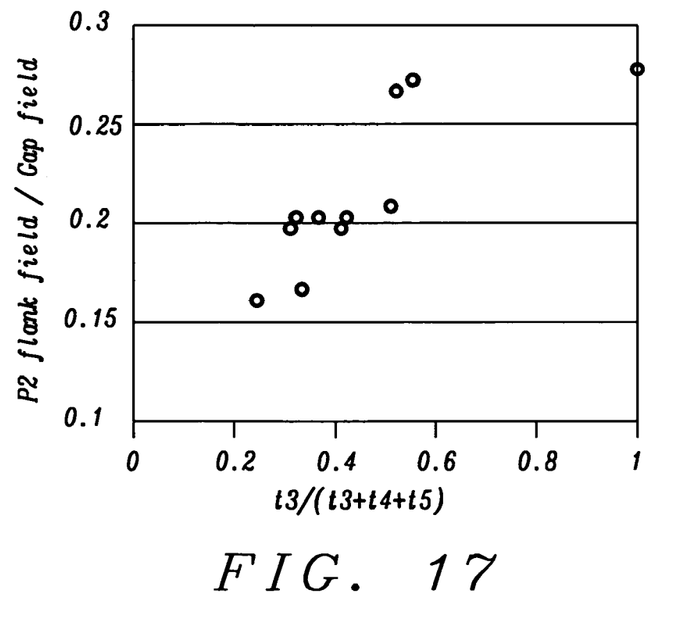
FIG. 17 is a plot that shows the ratio of flank field to gap field vs. the ratio of the thickness of the second pole tip region to the thickness of the backside region according to the second embodiment of the present invention.

Referring to FIG. 17, the present invention has been further characterized by determining the effect of the step thicknesses $t_3$, $t_4$, and $t_5$ depicted in FIG. 10 on the flank field/gap field ratio. The values on the x-axis represent the ratio $t_3/(t_3+t_4+t_5)$ and indicate the largest reduction in flank field occurs when the thickness ratio is between about 0.2 to 0.4. The results shown in FIG. 17 were generated with a $d_6$ distance of 0.4 microns, and a $d_7$ distance of 0.6 microns.

Those skilled in the art will appreciate that one or more steps in the top yoke of the present invention may be readily constructed by conventional methods. For example, a first yoke layer with a thickness $t_3$ may be formed on the dielectric layer 29 by conventional means. Then a second top yoke layer with a thickness $t_4$ is fabricated on the first top yoke layer by a process sequence involving deposition, patterning, ion etching, and trim milling methods known to those skilled in the art. The second top yoke layer is recessed from the ABS to form a first step. Likewise, a third top yoke layer with a thickness $t_5$ may be formed on the second top yoke layer with a similar process sequence involving deposition, patterning, ion etching, and trim milling steps. The third top yoke layer has a larger recess from the ABS than the second top yoke layer and forms a second step.

While this invention has been particularly shown and described with reference to, the preferred embodiment thereof, it will be understood by those skilled in the art that various changes in form and details may be made without departing from the spirit and scope of this invention.

We claim:

1. A magnetic write head, comprising:
   (a) a bottom yoke having a pedestal with a first pole tip that is formed along an air bearing surface (ABS);
   (b) a write gap layer formed above said pedestal; and
   (c) a planar top yoke connected to said bottom yoke through a back gap region, said planar top yoke has a second pole tip region and a front section that is narrower than a back section wherein said front section has front and back ends and a first thickness wherein said front end is attached to a back end of said second pole tip region formed above said write gap layer and wherein said second pole tip region has a second thickness less than said first thickness, a width, a length, and a front end or second pole tip formed along the ABS.

2. The magnetic write head of claim 1 wherein the length of said second pole tip region is the distance from the ABS to the front end of said front section which is about 0.2 to 2 microns.

3. The magnetic write head of claim 1 wherein the distance from the ABS to the back end of said front section is about 1 to 3 microns.

4. The magnetic write head of claim 1 wherein the first thickness is about 0.8 to 3 microns and the second thickness is about 0.4 to 1.2 microns.

5. The magnetic write head of claim 1 wherein the ratio of said second thickness to said first thickness is from about 0.3 to 0.7.

6. The magnetic write head of claim 1 wherein the width of said second pole tip region is about 0.1 to 0.25 microns.

7. The magnetic write head of claim 1 wherein the top yoke, second pole tip region, and bottom yoke are comprised of NiFe, CoNiFe, FeCo, or FeCoN.

8. The magnetic write head of claim 1 wherein said write gap layer and said first pole tip have a width that is equal to the width of said second pole tip region.

9. The magnetic write head of claim 1 further comprised of an overcoat insulating layer which is formed on said planar top yoke, a dielectric layer formed between said planar top yoke and said bottom yoke, and a coil layer formed within said dielectric layer.

10. The magnetic write head of claim 1 in which the bottom yoke also serves as a top layer in a read head in a merged read/write head structure.

11. The magnetic write head of claim 1 wherein the distance from the ABS to the back gap region is about 5 to 25 microns.

12. The magnetic write head of claim 1 wherein said planar top yoke has a bottom that is coplanar with said write gap layer.

13. The magnetic write head of claim 1 wherein said write gap layer extends a distance of about 0.4 to 1.2 microns from said ABS toward said back gap region.

14. A magnetic write head, comprising:
   (a) a bottom yoke having a pedestal with a first pole tip that is formed along an air bearing surface (ABS);
   (b) a write gap layer formed above said pedestal; and
   (c) a planar top yoke connected to said bottom yoke through a back gap region, said planar top yoke is comprised of:
      (1) a back section that has a first thickness and a front end attached to the back end of a front section;
      (2) a front section comprised of a first segment having a first thickness, a length, front and back ends wherein the back end is attached to the front end of the back section, and a second segment having a second thickness less than said first thickness, a length, and front and back ends wherein the back end is adjacent to the front end of said first segment and the front end is adjacent to the back end of a second pole tip region; and (3) a second pole tip region having a third thickness less than said second thickness, a width, a length, and front and back ends wherein the front end is a second pole tip formed along said ABS.

15. The magnetic write head of claim 14 wherein the combined lengths of said second segment and second pole tip region is the distance from the ABS to the front end of the first segment which is about 0.4 to 3 microns.

16. The magnetic write head of claim 14 wherein the length of the second pole tip region is the distance from the ABS to the front end of the second segment which is about 0.2 to 1.5 microns.

17. The magnetic write head of claim 14 wherein the first thickness is about 0.8 to 4 microns, the second thickness is about 0.6 to 2.6 microns, and the third thickness is about 0.4 to 1.2 microns.

18. The magnetic write head of claim 14 wherein the ratio of said third thickness to said first thickness is from about 0.2 to 0.6.

19. The magnetic write head of claim 14 wherein said width of the second pole tip region is about 0.1 to 0.25 microns.

20. The magnetic write head of claim 14 wherein said write gap layer extends a distance of about 0.4 to 1.2 microns from the ABS toward the back gap region.

21. The magnetic write head of claim 14 wherein the top yoke, second pole tip region, and bottom yoke are comprised of NiFe, CoNiFe, FeCo, or FeCoN.

22. The magnetic write head of claim 14 wherein the width of said second pole tip region is the same as the width of the write gap layer, first pole tip, and pedestal.

23. The magnetic write head of claim 14 further comprised of an overcoat insulating layer which is formed on said planar top yoke, a dielectric layer formed between said planar top yoke and said bottom yoke, and a coil layer formed within said dielectric layer.

24. The magnetic write head of claim 14 in which the bottom yoke also serves as a top layer in a read head in a merged read/write head structure.

25. The magnetic write head of claim 14 wherein the distance from the ABS to the back gap region is about 5 to 25 microns.

26. The magnetic write head of claim 14 wherein said planar top yoke has a bottom that is coplanar with said write gap layer.

* * * * *